United States Patent
Kwak et al.

(10) Patent No.: US 8,045,534 B2
(45) Date of Patent: Oct. 25, 2011

(54) METHOD FOR PROACTIVE COORDINATOR APPROPRIATION FOR WIRELESS PERSONAL AREA NETWORK

(75) Inventors: Byung-Jae Kwak, Seoul (KR); Nah-Oak Song, Daejon (KR); Jae-Young Kim, Gyeonggi-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 887 days.

(21) Appl. No.: 11/991,295

(22) PCT Filed: Nov. 29, 2006

(86) PCT No.: PCT/KR2006/005096
§ 371 (c)(1),
(2), (4) Date: Feb. 29, 2008

(87) PCT Pub. No.: WO2007/064146
PCT Pub. Date: Jun. 7, 2007

(65) Prior Publication Data
US 2009/0257397 A1 Oct. 15, 2009

(30) Foreign Application Priority Data

Dec. 1, 2005 (KR) .................. 10-2005-0116171
May 9, 2006 (KR) .................. 10-2006-0041670

(51) Int. Cl.
*H04W 4/00* (2009.01)
(52) U.S. Cl. ......... 370/338; 370/331; 455/436; 455/442
(58) Field of Classification Search .......... 370/338, 370/331; 455/436, 442
See application file for complete search history.

(56) References Cited

U.S. PATENT DOCUMENTS

| 2003/0086395 A1* | 5/2003 | Shanbhag | ............ 370/331 |
| 2005/0089000 A1* | 4/2005 | Bae et al. | ............ 370/338 |

FOREIGN PATENT DOCUMENTS

| KR | 2001-0076623 | 8/2001 |
| KR | 10-2004-0105290 | 12/2004 |
| KR | 10-2005-0055118 | 6/2005 |

OTHER PUBLICATIONS

"A seamless Coordinator Switching Scheme for wireless personal area network" by woo Soo kim , 2003.*

(Continued)

*Primary Examiner* — Dang Ton
*Assistant Examiner* — Pamit Kaur
(74) *Attorney, Agent, or Firm* — Staas & Halsey LLP

(57) ABSTRACT

Provided is a method for switching a piconet device to a coordinator in a piconet. The method receives the latest order of precedence as the next PNC information from the current PNC. Thereafter, the method detects a P-CTA allocated to devices of the piconet using a beacon of a superframe received from the PNC. On failing to receive a beacon from the PNC, the method detects whether "beacon non-receipt" indicating information that is transmitted between piconet devices during the detected P-CTA. If the "beacon non-receipt" indicating information is not detected, the method does not perform a PNC appropriation operation. If the "beacon non-receipt" indicating information is detected, the method determines that the PNC has left the piconet without performing a normal PNC handover procedure and thus performs a PNC appropriation operation according to the order of precedence information.

5 Claims, 2 Drawing Sheets

OTHER PUBLICATIONS

Korean Office Action issued on Feb. 28, 2007 in corresponding Korean Patent Application 10-2006-0041670.

Won Soo Kim et al., "A Seamless Coordinator Switching (SCS) Scheme for Wireless Personal Area Network", IEEE Transactions on Consumer Electronics, vol. 49, No. 3, pp. 554-560, Aug. 2003.

Hey-Jin Nam et al., "Active Seamless Coordinator Switching Scheme for the Fast PNC Handover in IEEE 802.15.3 WPAN", Proceedings of the 8th Conference on Next Generation Communication Software, pp. 216-219, Dec. 2004.

HeonJu Jeong et al., "PNC Candidate Inquiry Method for PNC Handover on WPAN", Personal, Indoor and Mobile Radio Communications, 2004. PIMRC 2004. 15th IEEE International Symposium on, vol. 3, pp. 1752-1756, Sep. 5-8, 2004.

Xin Liu et al., "An Improved Resource Reservation Algorithm for IEEE 802.15.3", Multimedia and Expo, 2006 IEEE International Conference on, pp. 589-592, Jul. 2006.

IEEE Standard for Information Technology—Telecommunications and Information Exchange between Systems—Local and Metropolitan Area Networks Specific Requirements Part 15.4: Wireless Medium Access Control (MAC) and Physical Layer (PHY) Specifications for Low-Rate Wireless Personal Area Networks (LR-WPANs), pp. 1-670, 2003.

\* cited by examiner

[Fig. 1]
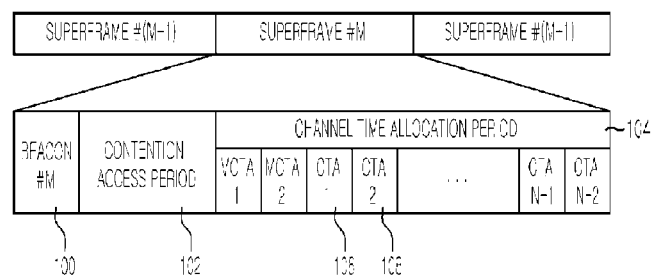
[Fig. 2]
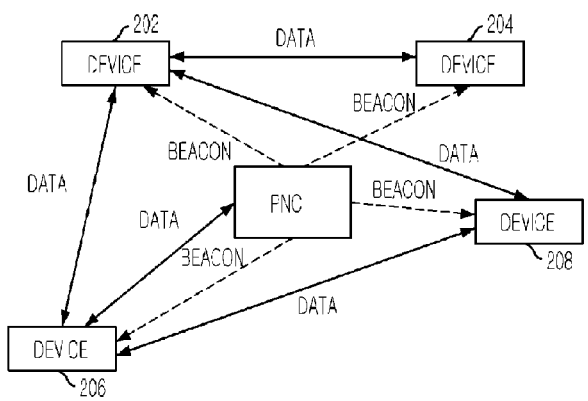
[Fig. 3]
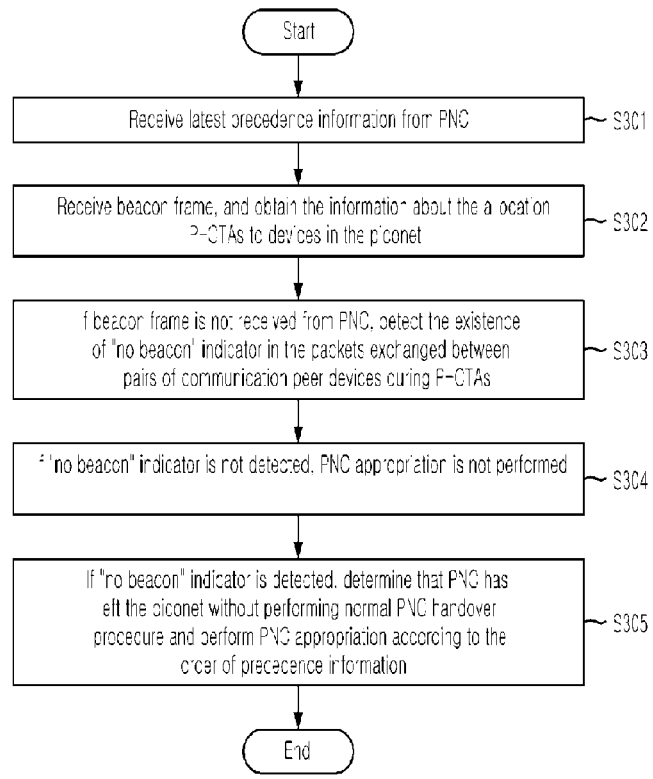

[Fig. 4]
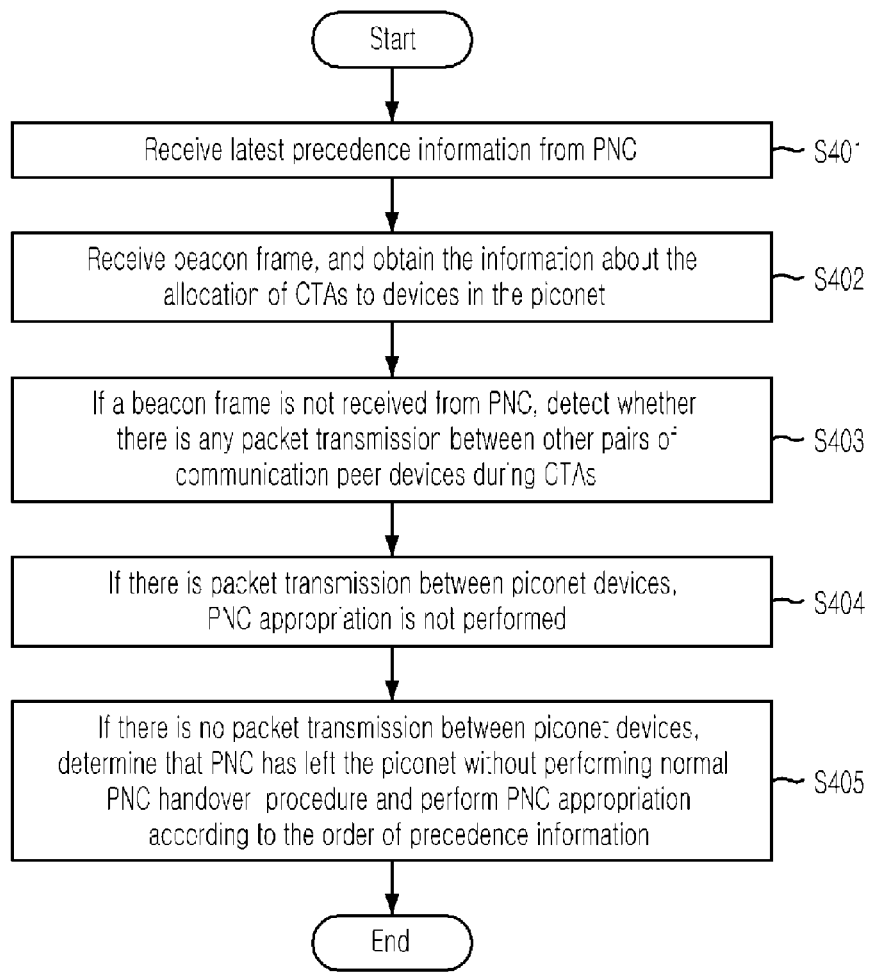
[Fig. 5]
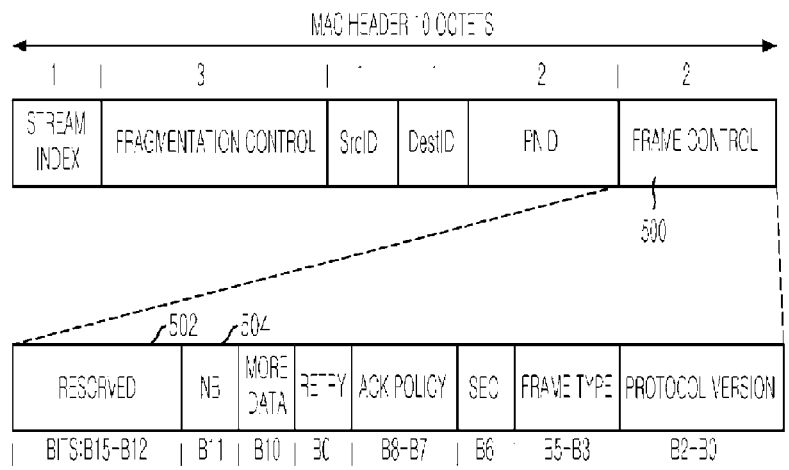

METHOD FOR PROACTIVE COORDINATOR APPROPRIATION FOR WIRELESS PERSONAL AREA NETWORK

Cross Reference to Related Applications

This application claims the benefit under 35 U.S.C. Section 371, of PCT International Application No. PCT/KR2006/005096, filed Nov. 29, 2006 which claimed priority to Korean Patent Application Nos. 10-2005-0116171, filed Dec. 1, 2005, and also 10-2006-0041670, filed May 9, 2006 in Republic of Korea, the contents of all of which are incorporated herein by reference.

TECHNICAL FIELD

The present invention relates to a method for proactive coordinator appropriation for a Wireless Personal Area Network; and more particularly, to a method for switching a piconet device to the next PicoNet Coordinator (PNC) in a piconet such as a Wireless Personal Area Network (WPAN) without affecting services in the piconet when the current PNC leaves the piconet without performing a normal PNC handover procedure.

BACKGROUND ART

A case where a PNC leaves a piconet without performing a normal PNC handover procedure is called "PNC failure."

A device with PNC capability serves as a new PNC when a PNC failure occurs. This operation is called "PNC appropriation." Piconet devices with P-CTA allocated participate in the PNC appropriation process, which are called "participating devices."

There is a continuing demand for provisioning for delay-stringent data traffics, such as audio/video (A/V) signals, in a wireless network environment. Examples of wireless communication protocols, which makes it possible to provide Quality of Service (QoS) required by applications susceptible to a transmission delay, are "IEEE 802.15.3 Wireless Medium Access Control (MAC) and Physical Layer (PHY) Specifications for High Rate Wireless Personal Area Networks (WPANs)" and "IEEE 802.15.4 Wireless Medium Access Control (MAC) and Physical Layer (PHY) Specifications for Low-Rate Wireless Personal Area Networks (LR-WPANs)."

A piconet refers to a wireless network of devices that share a common coordinator and operate in accordance with the IEEE 802.15.3 or similar standards, which includes one PNC and a plurality of devices around the PNC. The PNC performs an important operation of managing the piconet, and data transmission timing is given by a superframe.

The example in FIG. 1 illustrates the structure of a piconet superframe specified in the IEEE 802.15.3 standard.

A superframe of the IEEE 802.15.3 is composed of three parts: a Beacon 100, a Contention Access Period (CAP) 102, and a Channel Time Allocation Period (CTAP) 104.

The beacon 100 is used to provide data transmission timing in a piconet, to set the timing allocations, and to transmit management information to a plurality of piconet devices. The CAP 102 is used to communicate command packets and asynchronous data between the PNC and piconet devices. The CTAP 104 is composed of a plurality of Channel Time Allocations (CTAs) 106 and 108 that are used to transmit commands, isochronous data, and asynchronous data. The CTAs are classified into ordinary CTAs and Pseudo-static CTAs (P-CTAs).

Data traffics in a piconet can be classified into the following types:
  Asynchronous data type: This type usually does not have constraints on packet delivery time, an example of which is E-mail.
  Synchronous data type: This type is sensitive to a packet transmission delay but is not strict in requirements for a packet transmission delay.
  Interactive data type: A packet transmission delay of which can be sensed by a user but does not adversely affect the usability or functionality.
  Isochronous data type: This type is susceptible to a packet transmission delay and an excessive packet transmission delay adversely affects usability and functionality. A typical example is data that is generated when A/V signals are transmitted.

FIG. 2 illustrates an example of a piconet that is specified in the IEEE 802.15.3 standard.

The piconet includes: a PNC 200 for managing the piconet; and a plurality of piconet devices 202, 204, 206 and 208. The piconet devices are classified into devices with PNC capability and devices without PNC capability. That is, all of the piconet devices do not need to have all functionalities defined in the IEED 802.15.3 standard. For example, in a scenario where a computer and a portable storage device are wirelessly connected using the IEEE 802.15.3 technology, the computer can be implemented as a device with PNC capability and the portable storage device can be implemented as a simple device without PNC capability.

The PNC 200, which is responsible for starting, managing, and ending a piconet, broadcasts beacon frames at the beginning of every super-frame to the devices in the piconet so as to provide them with timing and piconet information. The information transmitted by the beacon frame includes the channel time allocation information, that is, which CTA is allocated to which pair of devices.

In general, the PNC 200 may change the location of a CTA within the superframe every superframe. Accordingly, a device failing to receive a beacon cannot transmit data. In order to prevent a case where the devices in the piconet fails to receive a beacon and thus a data throughput decreases, the device can request allocation of a special type of CTA called pseudo-static CTA (P-CTA) to the PNC. A device with a P-CTA allocated to itself can transmit data for a predetermined time duration using the P-CTA even after it failed to receive a beacon. The reason for this is that the location of the P-CTA within a superframe is guaranteed to remain static for a pre-determined number of superframes. For example, in the case of the IEEE 802.15.3 standard, the location of the P-CTA does not change at least for a time duration corresponding to "mMaxLostBeacon" superframes.

When a PNC wants to leave the piconet for some reason, it follows a PNC handover procedure so that the piconet can keep operating without interruption to its services. However, it is not always possible for a PNC to follow a PNC handover procedure before leaving the piconet due to various unpredictable situations such as abrupt power failure/off, hardware or software failure, sudden departure from the radio communication range of the piconet, and so on. The event of PNC leaving a piconet without following a proper handover procedure is called "PNC failure" as described above.

In the event of PNC failure, the piconet is left without a PNC and all the data traffics are interrupted due to the lack of coordination. To resume their communication, the remaining devices must follow a series of steps such as radio channel scanning, starting a new piconet, association, and CTA request/allocation. However, even when the devices can successfully resume their communications, following these steps will leave the piconet services seriously impaired. Especially, this kind of interruption may be unacceptable for isochronous data type, a typical data type for A/V signals.

When a piconet is in operation, the devices in the piconet are either idle or involved in one or more data transmissions either as a source or a destination device. The devices in the idle state, that is the devices with no packet to transmit, are affected little by the PNC failure. The devices with no packet to transmit have only to construct a new piconet when a need for packet transmission arises.

In the case of the devices transmitting non-isochronous data, data transmission is somewhat affected by the PNC failure. However, this problem can be solved by the upper layers of the Open System Interconnect (OSI) network stack in most cases.

On the other hand, in the case of the devices transmitting isochronous data, the PNC failure and the resulting interruption of data communication can lead to a service failure. What is therefore required is a scheme for minimizing the impact of the PNC failure on the transmission of the isochronous data.

An example of a conventional scheme for solving this problem is "A Seamless Coordinator Switching (SCS) Scheme for Wireless Personal Area Networks" proposed by Won-Soo Kim, Il-Whan Kim, Seung-Eun Hong and Chung-Gu Kang and published in "IEEE Transactions on Consumer Electronics (Vol. 49, No. 3, 554-560 pp, 2003. 8)."

The SCS scheme makes it possible to minimize the overhead due to piconet re-initialization caused by the PNC failure. In the SCS scheme, a PNC continuously manages and updates a list of PNC candidate devices along with the order of precedence of the devices, and broadcasts this information to devices in the piconet. The PNC determines the order of precedence of PNC candidate devices using information such as "PNC capability" defined in the IEED 802.15.3 standard. Each of the PNC candidate devices memorizes its order of precedence S. Each PNC candidate device decreases the memorized order of precedence S by 1 when it fails to receive a beacon for a predetermined time duration. If S reaches zero, the device takes on the responsibility of PNC.

The SCS scheme is advantageous in that it can be implemented by adding a few functions to the IEEE 802.15.3 standard. However, in case a hidden terminal problem exists, multiple devices may declare themselves as the next PNC, or a device may try to take on the PNC responsibility when the current PNC is operational.

The SCS scheme can reduce an overhead due to re-initialization when the PNC failure really occurs. However, when the "Hidden Terminal" problem exists, a healthy piconet may collapse. Moreover, it may take excessively a long time until the next PNC comes forward when the PNC failure occurs, which may seriously interrupt or terminate a service for isochronous data.

An example of a conventional method for solving these problems of SCS is "Active Seamless Coordinator Switching (ASCS) Scheme for Fast PNC Handover in WPAN" proposed by He-Jin Nam, Chong-Ho Yoon and Young-Ae Cheon and published in "Proceedings of the 8th conference on Next Generation Communication Software", pp. 216-219, 2004. 12.

Differently from SCS scheme depending only on received data, the ASCS scheme can minimize the impact of the PNC failure by transmitting a probe message in the CAP from a device failing to receive a beacon. However, the ASCS scheme conflicts with the IEED 802.15.3 standard that prohibits message transmission in the CAP when a device fails to receive a beacon.

DISCLOSURE

Technical Problem

It is, therefore, an object of the present invention to provide a method for switching a piconet device to a coordinator to sustain on-going services in a piconet in case of PNC failure. The present invention takes advantage of the static nature of the P-CTAs' location within the superframe by using the P-CTAs to exchange information between devices, and, based on the information exchanged, to have one of the devices eventually take over the role of PNC in case of PNC failure. The IEEE 802.15.3 standard allows transmission only in P-CTA when the beacon is not received. The action of a device taking over the role of PNC in case of PNC failure is referred to as "PNC appropriation." The devices with P-CTAs allocated for them, which will participate in the PNC appropriation procedure in case of PNC failure is referred to as "participating devices." Accordingly, it is possible to have one of the PNC-capable devices take over the role of the PNC with minimal impact on-going services when the PNC leaves the piconet without a proper PNC handover procedure.

Technical Solution

In accordance with one aspect of the present invention, there is provided a method for switching a piconet device to a coordinator in a piconet, the method including the steps of: receiving the latest order of precedence information from a PNC; detecting a P-CTA allocated to devices in the piconet from the information broadcasted in the beacon frame received from the PNC; if a beacon is not received from the PNC, detecting 'no beacon' indicators exchanged between piconet devices during P-CTAs within the superframe where the beacon is not received; not performing a PNC appropriation operation if 'no beacon' indicator is not detected; and if 'no beacon' indicator is detected, determining that the PNC has left the piconet without performing a normal PNC handover process, and performing a PNC appropriation operation according to the precedence information.

In accordance with another aspect of the present invention, there is provided a method for switching a piconet device to a coordinator in a piconet, the method including the steps of: receiving the latest order of precedence information from a PNC; detecting a CTA allocated to devices in the piconet from the information broadcasted in the beacon frame received from the PNC; if failing to receive a beacon from the PNC, detecting whether there is any packet transmitted between the piconet devices in CTAs within the superframe; if there is a packet transmitted between the piconet devices, not performing a PNC appropriation operation; and if there is no packet transmitted between the piconet devices, determining that the PNC has left the piconet without performing a normal PNC handover process, and performing a PNC appropriation operation according to the precedence information.

The present invention provides a proactive coordinator appropriation (PCA) scheme capable of maintaining the ongoing services in the piconet although the PNC failure occurs.

Also, when the PNC failure occurs in a wireless personal area network (WPAN), the present invention makes it possible to elect the next PNC and sustain the operation of the piconet without interrupting ongoing data services (specifically, interruption-susceptible services) in the piconet.

Also, a list of devices with a PNC capability, together with the order of precedence thereof, are determined by the PNC and broadcasted in the piconet. Accordingly, the device with the highest priority among the devices in the list serves as the next PNC when a PNC failure occurs.

Also, when the participating source devices fail to receive a beacon frame, they exchange a 'no beacon' indicator with each other within the P-CTA. Accordingly, it is possible to solve the 'Hidden Terminal' problem. Because the 'no beacon' indicator can be transmitted using a flag in an MAC header of a conventional packet frame, it can be easily implemented by adding only a few functions to the IEEE 802.15.3 standard.

ADVANTAGEOUS EFFECTS

In accordance with the present invention, inter-device communication in a pseudo-static CTA (P-CTA) of a superframe is allowed when receipt of a beacon fails, as defined in the IEEE 802.15.3 standard. The principle that the location of the P-CTA in the superframe does not change for a predetermined time duration is used to detect information that is exchanged between piconet devices during the P-CTA or the CTA if the participating destination device fails to receive a beacon. Accordingly, it is possible to have one of the PNC-capable devices take over the role of a PicoNet Coordinator (PNC) with minimal impact on the on-going services when PNC leaves the piconet without proper PNC handover procedure.

When the PNC failure occurs, a proactive coordinator appropriation (PCA) scheme is used to support the piconet while minimizing the impact of the PNC failure on ongoing services. Moreover, because the PCA scheme uses the P-CTA, it is possible to provide an excellent compatibility with the IEEE 802.15.3 standard and to enhance the operational reliability.

DESCRIPTION OF DRAWINGS

The above and other objects and features of the present invention will become apparent from the following description of the preferred embodiments given in conjunction with the accompanying drawings, in which:

FIG. 1 is a diagram illustrating an example of the structure of a piconet superframe specified in the IEEE 802.15.3 standard;

FIG. 2 illustrates an example of a piconet that is defined in the IEEE 802.15.3 standard;

FIG. 3 is a flowchart illustrating a PNC appropriation procedure in accordance with an embodiment of the present invention;

FIG. 4 is a flowchart illustrating a PNC appropriation procedure in accordance with another embodiment of the present invention; and FIG. 5 is a diagram illustrating an MAC header format containing a 'no beacon' indicator flag in a piconet conforming the IEEE 802.15.3 standard in accordance with an embodiment of the present invention.

BEST MODE FOR THE INVENTION

Other objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on prior art may obscure the points of the present invention, the detailed description will not be provided herein. The preferred embodiments of the present invention will be described in detail hereinafter with reference to the attached drawings.

FIG. 3 is a flowchart illustrating a PicoNet Coordinator (PNC) appropriation procedure in accordance with an embodiment of the present invention.

The procedure receives the latest order of precedence information from a PNC in step S301.

In step S302, the procedure obtains the information about the allocation of Pseudo-static Channel Time Allocations (P-CTAs) to devices in the piconet from a beacon received from the PNC.

In step S303, if it fails to receive a beacon frame from the PNC, the procedure detects the existence of 'no beacon' indicator in the packets exchanged between pairs of communication peer devices during P-CTAs.

In step S304, the procedure does not perform a PNC appropriation operation if the 'no beacon' indicator is not detected.

In step S305, if the 'no beacon' indicator is detected, the procedure determines that the PNC has left the piconet without performing a normal PNC handover process and thus performs a PNC appropriation according to the order of precedence information.

FIG. 4 is a flowchart illustrating a PNC appropriation procedure in accordance with another embodiment of the present invention.

The procedure receives the latest order of precedence information from a PNC in step S401.

In step S402, the procedure obtains information about the allocation of CTAs to devices in the piconet from the beacon received from the PNC.

In step S403, if it fails to receive a beacon from the PNC, the procedure detects whether there is any packet transmitted between the piconet devices during CTAs.

In step S404, if there is any packet transmitted between the piconet devices, the procedure does not perform a PNC appropriation.

In step S405, if there is no packet transmitted between the piconet devices, the procedure determines that the PNC has left the piconet without performing a normal PNC handover process and thus performs a PNC appropriation according to the order of precedence information.

The details of this are as follows:

For seamless PNC appropriation in case of PNC failure, the PNC continually updates a list of the next PNC candidate devices along with the order of precedence thereof. The order of precedence of the PNC candidate devices may be determined by the current PNC based on "PNC capability" of the IEEE 802.15.3 standard. If it is impossible to determine the order of precedence of the PNC candidate devices based on the "PNC capability," the tie is broken arbitrarily.

The information about the order of precedence of the PNC candidate devices is given to devices during the association process and also as an information element (IE) broadcasted in the beacon frame. If a new device is associated or if an associated device is disasociated, the order of precedence information is updated and broadcast to all the devices in the piconet. The participating device with the highest precedence will appropriate the role of PNC in the event of PNC failure by starting transmitting beacon frames.

At this point, the device with the highest priority is not necessarily a participating device. In addition, the participating devices are mostly devices with isochronous data, but it does not necessarily follow that only the devices with isochronous data become the participating devices.

When a device A transmits data to a device B, the devices A and B are called "communication peers." If a participating device does not receive a beacon frame, the device prepares for the possible PNC appropriation while waiting until the number of not received beacons reaches a pre-defined threshold. The "preparation" may include, but is not limited to, increasing/decreasing internal counters, transmitting a 'no beacon' indicator to its communication peer, or transmitting a reply with a 'no beacon' indicator in response to a received 'no beacon' indicator. 'No beacon' indicator is a flag indicating a failure to receive a beacon.

An operation of exchanging information between communication peers of participating devices form a handshake. This handshake between communications peers is necessary to make sure that a hidden terminal does not attempt PNC appropriation. The handshake between communications peers takes place in the P-CTA allocated thereto, by sending a 'no beacon' indicator embedded in ongoing packet transmission or ACK frames in the P-CTAs.

If it fails to receive a beacon, a participating device is required to listen to the P-CTAs allocated to other devices as well as P-CTAs allocated to itself. This makes it possible to observe a handshake of other communication peers exchanging 'no beacon' indicators, and to determine whether other devices have received a beacon.

In an alternative method, a participating device is allowed to listen to normal CTAs as well as P-CTAs in a superframe where receipt of a beacon failed. Transmission in a normal CTA is prohibited when reception of a beacon fails. Accordingly, the reliability of PNC allocation can be enhanced by observing whether packet transmission occurs in the CTA.

The actual PNC appropriation takes place when the participating device with the highest precedence starts transmitting beacon frames when the number of beacon frames, which are not received, exceeds the pre-defined threshold.

After a new PNC-capable device appropriates the role of PNC, the new PNC may use information request commands to collect information about the piconet and the devices in the piconet. There may be devices whose registration (i.e., association) becomes invalid as a result of the PNC allocation. These devices must re-associate with the new PNC so as to participate in the piconet.

During normal operation of a piconet, the PNC may decide not to transmit one or more consecutive beacon frames so as to perform other duties as a PNC. In this case, the number of consecutive beacon frames that are not transmitted is smaller than the predetermined threshold. Accordingly, the devices attempt PNC appropriation only when the number of consecutive beacon frames that are not transmitted is equal to or greater than the predetermined threshold. At this point, if a device did not receive the beacon frames, but is not able to listen to the P-CTAs or CTAs of other devices for some reason, it should not attempt PNC appropriation.

The beacon frames contain all CTA allocation information. Therefore, by receiving the beacon frames, the devices know which devices have P-CTAs allocated, and only the devices allocated with the P-CTA can participate in the PNC appropriation process.

A participating source device transmits data to a participating destination device. When the participating source device fails to receive a beacon frame, it informs the participating destination device of this fact within the P-CTA in the corresponding superframe. At this point, a 'no beacon' indicator is transmitted as a flag in the MAC header of an ongoing data packet.

Then, the participating destination device detects the flag in the MAC header in the packet received from the participating source device, and determines that the participating source device has failed to receive a beacon frame. When an immediate-acknowledgement (Imm-ACK) is requested, the participating destination device responds with an indication whether it received the beacon or not. The response is embedded as a 'no beacon' indicator flag in the MAC header of a normal ACK frame.

When the participating source device does not receive a 'no beacon' indicator from the participating destination device, it determines that the participating destination device has received a beacon.

An absence of the 'no beacon' indicator from the communication is interpreted as a passive indication that the peer device has received the beacon correctly. For example, there is a case where the participating source device does not transmit a 'no beacon' indicator to the participating destination device although it has failed to receive a beacon. In this case, the participating destination device determines that the participating source device has succeeded in receiving a beacon, and thus does not transmits a 'no beacon' indicator to the participating source device.

If a participating device has completed its transmission of data and thus has no data to transmit in the superframe with missing beacon, it creates a packet with zero length payload to send a 'no beacon' indicator.

A PNC appropriation policy can be either aggressive or conservative. An aggressive policy has higher probability of PNC appropriation taking place, and can be more efficient when PNC failure actually occurs. However, the probability of interrupting a healthy piconet is also greater with an aggressive PNC appropriation policy.

An example of a conservative PNC appropriation policy in four phases is as follow.

Phase I

Failing to receive a beacon, each participating device transmits a 'no beacon' indicator within the P-CTA in the superframe corresponding to the beacon which is not received. At this point, the participating devices preserve their original behavior as much as possible.

A participating source device transmits a 'no beacon' indicator as a flag in the MAC header of a TX data packet, but does not change the ACK policy. If there is no TX packet to transmit, a packet with zero-length payload with the ACK policy field set to Imm-ACK (immediate ACK) is created with to send a 'no beacon' indicator.

When a participating destination device fails to receive a 'no beacon' indicator from its peer participating source device, it determines that the participating source device has received a beacon. If the participating destination device does not receive a beacon frame, it sends a 'no beacon' indicator to its peer source device only when it receives a 'no beacon' indicator from its peer source device and the ACK policy in the packet from the peer source device is set to Imm-ACK. At this point, all the participating devices also listen to the P-CTAs of other participating devices.

Phase II

In this phase, a participating source device in the piconet sets the ACK policy to Imm-ACK and sends a 'no beacon' indicator as a flag, and checks whether there is 'no beacon' indicator in the ACK frames from the peer devices. A packet with zero-length payload is created if necessary.

The participating destination devices operate in the same manner as in Phase I.

One exception to this rule is when there is no room for an ACK packet in the currently allocated P-CTA, in which case 'no beacon' indicator is sent with the existing ACK policy unchanged. This is done to prevent unnecessary packet drops caused by a hidden terminal problem That is, a device experiencing a hidden terminal problem will listen to the handshakes by other devices, and learns it was a false alarm before it decides to drop a packet for a handshake with its peer device.

All the participating devices also listen to the P-CTAs of other participating devices.

Phase III

In this phase, every participating source DEV sends a 'no beacon' indicator to its communication peer device with the ACK policy set to Imm-ACK. If a participating source device determines that there is no room for an ACK packet in the currently P-CTA allocated to it, it drops the payload and transmits a packet with zero-length payload.

The behavior of the participating destination device is the same as in Phase I.

Phase IV

The participating device with the highest precedence starts transmitting beacons.

Tables 1 and 2 below illustrate an exemplary case where a pseudo-code is used to implement the above PNC appropriation policy for the participating source device and the participating destination device. In the exemplary case, the participating destination devices do not listen to the 'regular' CTAs in order to perform PNC appropriation.

TABLE 1

PNC Appropriation Procedure for Participating Source DEVs

```
01: Set number of missing beacons to zero
02:
03: // Phase I
04: WHILE number of missing beacons is smaller than threshold 1
05:     Listen to the next beacon
06:     IF the next beacon received THEN
07:         GOTO line 1
08:     ELSE
09:         Increase number of missing beacons by 1
10:         FOR all the P-CTAs in the superframe
11:             IF next P-CTA mine THEN
12:                 Send 'no beacon' indicator
13:                 IF current ACK policy is Imm-ACK THEN
14:                     Listen to the ACK
15:                     IF no 'no beacon' indicator in ACK THEN
16:                         GOTO line 1
17:                     ENDIF
18:                 ENDIF
19:             ELSE
20:                 Listen to the next P-CTA
21:                 IF there exists a packet without 'no beacon' indicator THEN
22:                     GOTO line 1
23:                 ENDIF
24:             ENDIF
25:         ENDFOR
26:     ENDIF
27: ENDWHILE
28:
29: // Phase II
30: WHILE number of missing beacons is smaller than threshold 2
31:     Listen to the next beacon
32:     IF the next beacon received THEN
33:         GOTO line 1
34:     ELSE
35:         Increase number of missing beacons by 1
36:         For all the P-CTAs in the superframe
37:             IF next P-CTA mine THEN
38:                 IF room for an ACK in the current P-CTA THEN
39:                     Set ACK policy to Imm-ACK
40:                     Send 'no beacon' indicator
41:                     Listen to the ACK
42:                     IF no 'no beacon' indicator in ACK THEN
43:                         GOTO line 1
```

TABLE 1-continued

PNC Appropriation Procedure for Participating Source DEVs

```
44:                     ENDIF
45:                 ELSE
46:                     Send 'no beacon' indicator with the current ACK policy
47:                 ENDIF
48:             ELSE
49:                 Listen to the next P-CTA
50:                 IF 9 a packet without 'no beacon' indicator THEN
51:                     GOTO line 1
52:                 ENDIF
53:             ENDIF
54:         ENDFOR
55:     ENDIF
56: ENDWHILE
57:
58: // Phase III
59: WHILE number of missing beacons is smaller than threshold 3
60:     Listen to the next beacon
61:     IF the next beacon received THEN
62:         GOTO line 1
63:     ELSE
64:         Increase number of missing beacons by 1
65:         FOR all the P-CTAs in the superframe
66:             IF next P-CTA mine THEN
67:                 IF room for an ACK in the current P-CTA THEN
68:                     Set ACK policy to Imm-ACK
69:                     Send 'no beacon' indicator
70:                 ELSE
71:                     Drop the payload of the current packet
72:                     Set the ACK policy to Imm-ACK
73:                     Send 'no beacon' indicator
74:                 ENDIF
75:                 Listen to the ACK
76:                 IF no 'no beacon' indicator in ACK THEN
77:                     GOTO line 1
78:                 ENDIF
79:             ELSE
80:                 Listen to the next P-CTA
81:                 IF there exists a packet without 'no beacon' indicator THEN
82:                     GOTO line 1
83:                 ENDIF
84:             ENDIF
85:         ENDFOR
86:     ENDIF
87: ENDWHILE
88:
89: // Phase IV
90: IF my order of precedence is the highest THEN
91:     Start transmitting beacon
92: ENDIF
```

TABLE 2

PNC Appropriation Procedure for Participating Destination DEVs

```
01: Set number of missing beacons to zero
02:
03: // Phase I, II, and III
04: WHILE number of missing beacons is smaller than threshold 3
05:     Listen to the next beacon
06:     IF the next beacon received THEN
07:         GOTO line 1
08:     ELSE
09:         Increase number of missing beacons by 1
10:         FOR all the P-CTAs in the superframe
11:             IF next P-CTA mine THEN
12:                 Listen to the transmission from the source peer DEV
13:                 IF no transmission from the source peer DEV THEN
14:                     GOTO line 1
15:                 ELSE
```

TABLE 2-continued

PNC Appropriation Procedure for Participating Destination DEVs

```
16:              IF 'no beacon' indicator received
                 THEN
17:                  IF ACK policy is Imm-ACK THEN
18:                      Send ACK with 'no beacon'
                         indicator
19:                  ENDIF
20:              ELSE
21:                  GOTO line 1
22:              ENDIF
23:          ENDIF
24:      ELSE
25:          Listen to the next P-CTA
26:          IF there exist a packet without 'no beacon'
indicator THEN
27:              GOTO line 1
28:          ENDIF
29:      ENDIF
30:     ENDFOR
31:   ENDIF
32: ENDWHILE
33:
34: // Phase IV
35: IF my order of precedence is the highest THEN
36:     Start transmitting beacon
37: ENDIF
```

The PNC appropriation does not require all of the above four phases. For example, the first and second phases may be selectively omitted for simplicity.

FIG. 5 is a diagram illustrating an MAC header format containing a 'no beacon' indicator flag in a piconet conforming to the IEEE 802.15.3 standard in accordance with an embodiment of the present invention.

An MAC header includes a 16-bit 'FRAME CONTROL' section, and the 'FRAME CONTROL' Section includes a reserved field. Among the 5 reserved bits b15 to b11 (502 and 504) out of the 16 bits of the 'FRAME CONTROL' section, a 'no beacon' indicator flag uses a bit b11 (504) to indicator the absence or presence of the beacon.

The methods in accordance with the embodiments of the present invention can be realized as programs and stored in a computer-readable recording medium that can execute the programs. Examples of the computer-readable recording medium include CD-ROM, RAM, ROM, floppy disks, hard disks, magneto-optical disks and the like.

The present application contains subject matter related to Korean patent applications No. 2005-116171, and No. 2006-41670 filed in the Korean Intellectual Property Office on Dec. 1, 2005 and May 9, 2006, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for proactive coordinator appropriation for a Wireless Personal Area Network, the method comprising:
   receiving the latest order of precedence information from a PicoNet Coordinator (PNC);
   detecting a Pseudo-static Channel Time Allocation (P-CTA) allocated to devices of a piconet from a beacon of a superframe received from the PNC;
   if a new beacon is not received from the PNC, detecting whether "beacon non-receipt" indicating information that is transmitted between piconet devices during the detected P-CTA;
   holding a PNC switch operation if the "beacon non-receipt" indicating information is not detected; and
   if the "beacon non-receipt" indicating information is detected, determining that the PNC has left the piconet without performing a normal PNC handover process, and performing a PNC appropriation according to the order of precedence information.

2. The method as recited in claim 1, further comprising:
   transmitting the "beacon non-receipt" indicating information to a communication peer if a new beacon is not received from the PNC.

3. The method as recited in claim 2, wherein the transmitting the "beacon non-receipt" indicating information includes writing and detecting whether an Immediate-ACKnowledgement (Imm-ACK) is requested using a flag of a MAC header.

4. The method as recited in claim 3, wherein the "beacon non-receipt" indicating information is a 'no beacon' indicator flag that is written at a bit b11 among 5 reserved bits b15 to b11 among 16 bits of a 'Frame Control' section in an MAC header of the IEEE 802.15.3 standard.

5. The method as recited in claims 1, wherein the determining and performing includes:
   performing PNC appropriation on the device with highest order if precedence taking over the role of PNC if the "beacon non-receipt" indicating information is transmitted and detected between all of communication peer devices in the piconet.

* * * * *